No. 855,825. PATENTED JUNE 4, 1907.
P. V. W. WELSH.
CAMERA STAND.
APPLICATION FILED DEC. 8, 1906.
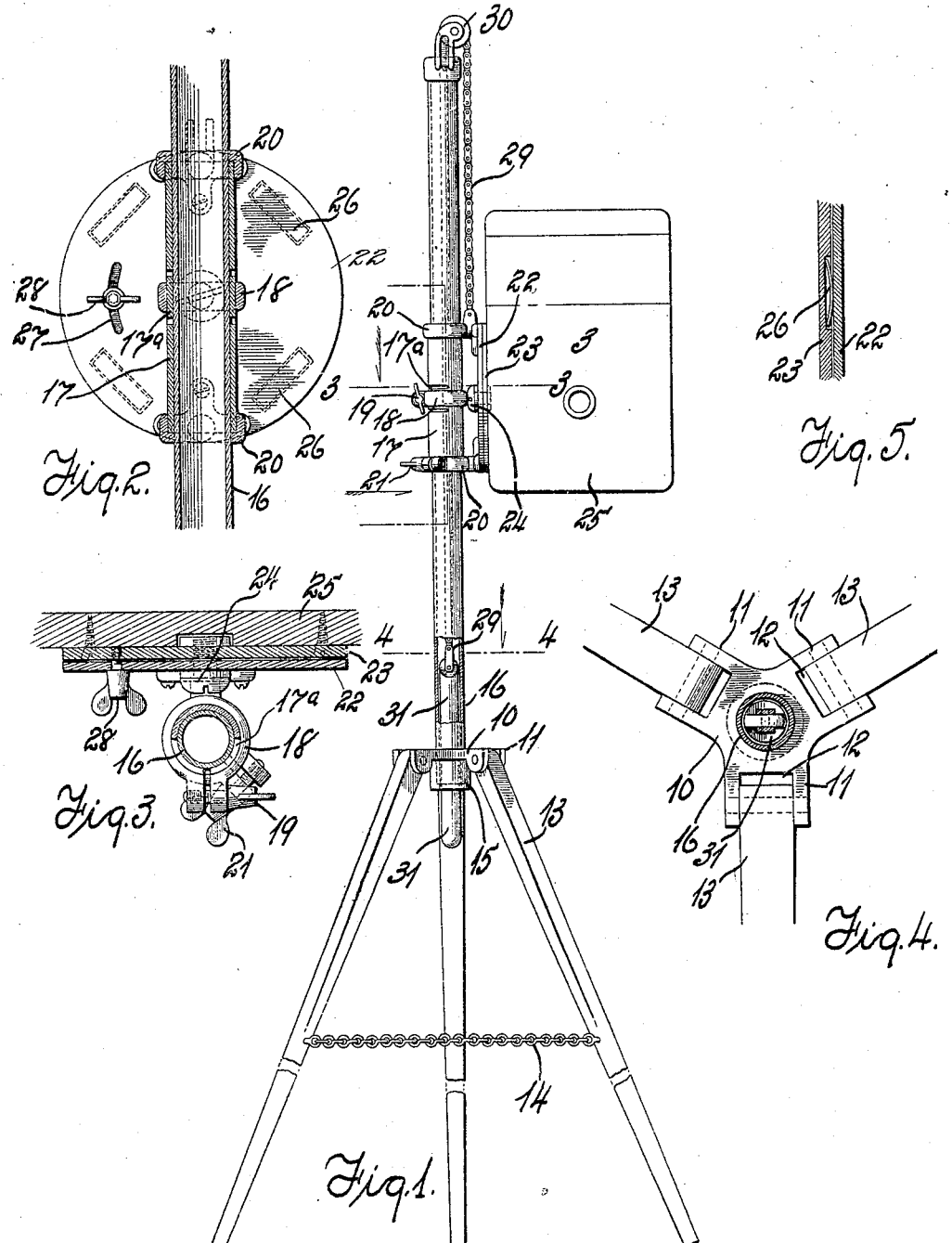
WITNESSES:
Frank L. Stubbs
Ralph Lancaster
INVENTOR
Pierre V. W. Welsh,
BY
W. B. Hutchinson
ATTORNEY

UNITED STATES PATENT OFFICE.

PIERRE V. W. WELSH, OF NEW YORK, N. Y.

CAMERA-STAND.

No. 855,825.      Specification of Letters Patent.      Patented June 4, 1907.

Application filed December 8, 1906. Serial No. 346,846.

*To all whom it may concern:*

Be it known that I, PIERRE V. W. WELSH, of the city of New York, county of Kings, and State of New York, have invented a new and Improved Camera-Stand, of which the following is a full, clear, and exact description.

My invention relates to improvements in camera stands, and the object of my invention is to produce a camera stand which is not expensive, is not likely to get out of repair, and which has a wide radius of adjustability.

More particularly my invention is intended to produce a camera stand which occupies little space, which has its legs readily adjustable in and out, and which has a convenient and accurate means of adjusting the camera quickly so that it can be turned on either a vertical or horizontal axis and fastened in the desired position, all to the end that the instrument may be quickly and accurately focused and securely held.

To these ends my invention consists of certain features of construction and combinations of parts, which will be hereinafter described and claimed.

Reference is to be had to the accompanying drawings forming a part of this specification, in which similar figures of reference indicate corresponding parts in all the views.

Figure 1 is a broken front elevation of a camera stand embodying my invention. Fig. 2 is a longitudinal section through the fastening sleeve and its supporting post. Fig. 3 is a sectional plan on the line 3—3 of Fig. 1. Fig. 4 is a sectional plan on the line 4—4 of Fig. 1, and Fig. 5 is a detail through the adjusting plates.

The stand is provided with a suitable base plate 10, which, to make it compact, is preferably small in the center, and provided with arms 11, but this structure is not important, and the arms are slotted as at 12 to receive the ends of the legs 13 which support the stand like the ordinary tripod legs, except that they are made to swing freely in and out, and their outward movement can be limited by a chain 14 connecting each pair of legs. This arrangement enables the structure to be folded up in compact shape, and by releasing the chain the legs can be folded up against the main post 16, which is in the form of a hollow tube extending upward from the plate 10, and which is fastened in the sleeve socket 15 on the plate, though it can be secured in any convenient way.

Sliding longitudinally on the post 16 is a fastening sleeve 17, which has a middle section 17ª formed by cutting slots through the sleeve so as to leave this middle section springy, and the said section is clasped by a split ring 18, the ends of which are connected by the screw 19, and by tightening the screw, the part 17ª is jammed against the post 16, and the sleeve prevented from moving longitudinally.

The ends of the sleeve 17 have rings 20 journaled thereon, which are also split, and which can be clamped to the sleeve by a suitable thumb screw 21. The rings 20 are fast to the part 22, which is preferably in the form of a disk and fits against the corresponding plate 23, this having a screw 24 which serves as a pivot for the disk 22. The plate or disk 23 is rigidly secured to the camera 25, as shown clearly in Fig. 3. The plate 23 has recesses in the face next the plate 22, in which recesses are the friction springs 26 which press against the plate 22 and prevent the latter from turning too easily, in fact the friction should be sufficient to prevent the plates from turning in relation to each other unless pressure is exerted on the camera case 25 to swivel the plates. The plates can be held in a fixed relative position by the thumb screw 28 extending through the slot 27 in the plate 22, and into the plate 23, as shown clearly in Fig. 2.

In order that the camera may be adjusted easily up and down, it is preferably counterbalanced, and to this end it is secured to a chain 29, or equivalent support, which runs over a guide pulley 30 on the top of the post 16, and downward into the tubular post, where it is attached to a counter-balancing weight 31.

It will therefore be seen that by loosening the thumb screw 19, the sleeve 17 and the camera 25 can be easily moved up or down to get the right vertical adjustment, and that the sleeve can then be quickly fastened by a turn of the thumb screw 19. It will also be seen that the adjustment can be further regulated as usual by tipping the legs 13 more or less as desired. For horizontal adjustment, the thumb screw 21 can be loosened and the camera 25 turned around the post 16, the rings 20 turning on the sleeve 17, and then when properly focused, the camera is secured by tightening the thumb screw 21. For adjusting on a horizontal axis, the thumb screw 28 is loosened, and the camera tipped up or down as desired, and its position fixed, if necessary, by turning the thumb screw 28. It will also be understood that any equivalent fastening devices can be substituted for the thumb screws referred to.

It will be seen that I have provided a very simple stand, which carries the camera securely, and which provides for every necessary adjustment to procure a quick and accurate focus.

Having thus fully described my invetion, I claim as new and desire to secure by Letters Patent:—

1. A stand of the kind described, comprising a hollow post, supporting legs therefor, a casing slidable up and down on the post, a counter-balance sliding in the post and connected over the post top to the casing, means for permitting the turning of the casing on both a horizontal and vertical axis, and means for securing the casing in the desired position.

2. A stand of the kind described, comprising a hollow supporting post, legs pivotally connected to the post, a casing slidably mounted on the post and also arranged to tip on a horizontal axis, and a counter-balance running in the post and connecting over the post top to the casing.

3. The combination of the supporting post, the sleeve slidable thereon and secured thereto, the rings turning on the sleeve, the flat plate carried by the rings, and a second flat plate turning in relation to the first and adapted to support a casing.

4. The combination of the post, the flat plate secured to the post so as to slide in relation thereto, the second flat plate turning in relation to the first and adapted to be secured to a casing, and friction devices between the two plates.

5. A structure of the kind described, comprising a stand having legs pivoted thereto and adapted to fold upward, a post supported on the stand, a sleeve sliding on the post, a fastening device to fix the position of the sleeve, rings turning on the sleeve, fastening devices to secure the rings, a plate carried by the rings, a second plate adapted to be secured to a casing, and the two plates turning in relation to each other, and a fastening device to fix the relative positions of the plates.

6. A structure of the kind described, comprising a hollow post, supporting legs therefor, a casing slidable up and down on the post, a counter-balance sliding in the post, an operative connection between the casing and the counter-balance, means for permitting the turning of the casing on both a horizontal and vertical axis, and means for securing the casing in the desired position.

PIERRE V. W. WELSH.

Witnesses:
WARREN B. HUTCHINSON,
FRANK L. STUBB.